United States Patent
Luo et al.

(10) Patent No.: US 10,489,047 B2
(45) Date of Patent: Nov. 26, 2019

(54) TEXT PROCESSING METHOD AND DEVICE

(71) Applicant: BEIJING BYTEDANCE NETWORK TECHNOLOGY CO LTD., Beijing (CN)

(72) Inventors: Yonghao Luo, Beijing (CN); Zuohui Tian, Beijing (CN)

(73) Assignee: Beijing Bytedance Network Technology Co Ltd., Beijing (CN)

( * ) Notice: Subject to any disclaimer, the term of this patent is extended or adjusted under 35 U.S.C. 154(b) by 113 days.

(21) Appl. No.: 15/391,340

(22) Filed: Dec. 27, 2016

(65) Prior Publication Data
US 2018/0107359 A1    Apr. 19, 2018

(30) Foreign Application Priority Data
Oct. 18, 2016    (CN) .......................... 2016 1 0908977

(51) Int. Cl.
*G06F 3/0488* (2013.01)
*G06F 3/0482* (2013.01)
(Continued)

(52) U.S. Cl.
CPC .......... *G06F 3/0488* (2013.01); *G06F 3/0482* (2013.01); *G06F 17/2705* (2013.01);
(Continued)

(58) Field of Classification Search
CPC .. G06F 3/0488; G06F 3/0482; G06F 17/2705; G06F 17/2755; G06F 17/277; G06F 17/2785; G06F 17/2863
See application file for complete search history.

(56) References Cited

U.S. PATENT DOCUMENTS 9,384,409 B1 * 7/2016 Ming ...................... G06K 9/348
2008/0221863 A1 * 9/2008 Liu ...................... G06F 17/2863
704/2

(Continued)

FOREIGN PATENT DOCUMENTS

CN    102609208 A    7/2012
CN    102929924 A    2/2013
(Continued)

OTHER PUBLICATIONS

WO 2015/000429 : Intelligent word selection method and device Publication date: Aug. 1, 2015 Author: Jiang, Nan (Year: 2015).*

(Continued)

*Primary Examiner* — Mandrita Brahmachari
(74) *Attorney, Agent, or Firm* — Mauriel Kapouytian Woods LLP; Serge Krimnus; Michael Mauriel

(57) ABSTRACT

A text processing method is provided, including: acquiring position information of an external touch in response to the external touch sensed by a touch terminal; acquiring a character image based on the position information of the external touch; acquiring a first text by recognizing characters in the character image; acquiring a word segmentation result by performing word segmentation on characters in the first text; and displaying the word segmentation result. The text processing method combines technologies of touch sensing, image recognition and word segmentation, so as to acquire efficiently and quickly a character, a word, a named entity, and the like in the region indicated by the external touch for various systems, which is convenient for a user to select a keyword directly in the text instead of inputting the keyword in the follow-up operation, thus improving the efficiency of operation.

16 Claims, 9 Drawing Sheets

(51) Int. Cl.
*G06F 17/27* (2006.01)
*G06F 17/28* (2006.01)

(52) U.S. Cl.
CPC ........ *G06F 17/277* (2013.01); *G06F 17/2755* (2013.01); *G06F 17/2785* (2013.01); *G06F 17/2863* (2013.01)

(56) References Cited

U.S. PATENT DOCUMENTS

| | | | |
|---|---|---|---|
| 2009/0299730 A1* | 12/2009 | Joh | G06F 17/273 704/9 |
| 2010/0241958 A1* | 9/2010 | Fish | G06F 3/04883 715/702 |
| 2014/0098031 A1* | 4/2014 | Aizawa | G06F 3/041 345/173 |
| 2014/0304280 A1* | 10/2014 | Oursbourn | G06K 9/344 707/754 |
| 2015/0095855 A1* | 4/2015 | Bai | G06F 3/017 715/863 |
| 2015/0170243 A1* | 6/2015 | He | G06Q 30/0621 705/26.5 |
| 2016/0266769 A1* | 9/2016 | Oursbourn | G06K 9/00442 |
| 2017/0024089 A1* | 1/2017 | Wang | G06F 3/0488 |
| 2017/0293604 A1* | 10/2017 | Zhu | G06F 17/24 |

FOREIGN PATENT DOCUMENTS

| | | | | |
|---|---|---|---|---|
| CN | 102609208 B | * | 1/2014 | |
| CN | 104731797 A | | 6/2015 | |
| CN | 105824552 A | | 8/2016 | |
| WO | WO-2015120713 A1 | * | 8/2015 | G06F 3/013 |

OTHER PUBLICATIONS

WO 2015/120713 : english translation Publication date: Aug. 20, 2015 Author: Xiao et. al. (Year: 2015).*

* cited by examiner

TEXT PROCESSING METHOD AND DEVICE

CROSS REFERENCE TO RELATED APPLICATION

The present application claims priority to Chinese Patent Application No. 201610908977.2, titled "TEXT PROCESSING METHOD AND DEVICE", filed on Oct. 18, 2016 with the State Intellectual Property Office of People's Republic of China, which is incorporated herein by reference in its entirety.

TECHNICAL FIELD

The present disclosure relates to the field of man-machine interaction, and in particular, to a text processing method and a text processing device.

BACKGROUND

At present, people receive a large amount of text information every day through touch terminals such as mobile phones or tablet computers, Examples of the text information includes short messages and messages pushed by various applications such as instant messaging software. When a user of a touch terminal wants to operate a keyword of interest in the text information (for example, searching or sharing a keyword in the text information), it will require multiple operation steps, which is time-consuming and inconvenient.

Thus, those skilled in the art need to provide a text processing method and a text processing device to facilitate operating a keyword in a text by a user.

SUMMARY

In order to address the issue in the conventional art, the present disclosure provides a text processing method and a text processing device to facilitate operating a keyword in a text by a user.

Embodiments of the present disclosure provide a text processing method, including:

acquiring position information of an external touch in response to an external touch sensed by a touch terminal;

acquiring a character image based on the position information of the external touch;

acquiring a first text by recognizing characters in the character image;

acquiring a word segmentation result by performing word segmentation on characters in the first text; and displaying the word segmentation result.

Preferably, the step of acquiring a character image based on the position information of the external touch includes:

acquiring a word segmentation region based on the position information of the external touch; and acquiring the character image by taking a screenshot of the word segmentation region.

Preferably, the step of acquiring a word segmentation region based on the position information of the external touch includes:

acquiring region position information of each of display regions of the touch terminal;

detecting a position relationship between the external touch and each of the display regions of the touch terminal, based on the position information of the external touch and the region position information of each of the display regions of the touch terminal; and determining a first display region as the word segmentation region if the external touch falls in the first display region, where the first display region is one of the display regions of the touch terminal.

Preferably, the step of displaying the word segmentation result includes:

generating a word segmentation display interface and one or more view controls;

adding each item in the word segmentation result respectively into one of the view controls; and displaying all of the view controls on the word segmentation display interface.

Preferably, the step of acquiring a word segmentation result by performing word segmentation on characters in the first text includes:

determining whether the number of characters of the first text is greater than a preset value;

acquiring the word segmentation result by performing the word segmentation on all characters in the first text if the number of characters of the first text is not greater than the preset value; and determining a second text based on the position information of the external touch and acquiring the word segmentation result by performing the word segmentation on all characters in the second text, if the number of characters of the first text is greater than the preset value, where the first text includes all characters in the second text, and the number of characters of the second text is equal to the preset value.

Preferably, after displaying the word segmentation result, the following steps are included:

receiving a keyword selection instruction triggered by a user based on the word segmentation result;

acquiring a keyword selected by the user from the word segmentation result in response to the keyword selection instruction;

displaying the keyword;

receiving a keyword operation instruction triggered by the user, where the keyword operation instruction carries an operation type, and the operation type includes searching and sharing; and operating the keyword in accordance with the operation type.

Embodiments of the present disclosure also provide another text processing method, including:

displaying a character region on the touch screen;

acquiring a character image by taking a screenshot of the character region, in response to an external touch to the character region;

acquiring a to-be-processed text by recognizing characters in the character image;

performing word segmentation on characters in the to-be-processed text; and displaying a word segmentation result.

Preferably, the step of displaying a word segmentation result, specifically includes:

generating a word segmentation display interface, where the word segmentation display interface includes one or more subviews; and displaying each item in the word segmentation result respectively in one of the subviews.

Embodiments of the present disclosure also provide a text processing device, including: a position acquisition module, an image acquisition module, a character recognition module, a word segmentation processing module and a word segmentation display module;

the position acquisition module is configured to acquire position information of an external touch in response to an external touch sensed by a touch terminal;

the image acquisition module is configured to acquire a character image based on the position information of the external touch;

the character recognition module is configured to acquire a first text by recognizing characters in the character image;

the word segmentation processing module is configured to acquire a word segmentation result by performing word segmentation on the first text; and the word segmentation display module is configured to display the word segmentation result.

Preferably, the image acquisition module includes: an acquisition sub-module and a screenshot sub-module;

the acquisition sub-module is configured to acquire a word segmentation region based on the position information of the external touch; and the screenshot sub-module is configured to acquire the character image by taking a screenshot of the word segmentation region.

Preferably, the acquisition sub-module includes: a position information acquisition sub-module, a position relationship determination sub-module and a word segmentation region determination sub-module;

the position information acquisition sub-module is configured to acquire region position information of each of display regions of the touch terminal;

the positional relationship determination sub-module is configured to detect a position relationship between the external touch and each of the display regions of the touch terminal, based on the position information of the external touch and the region position information of each of the display regions of the touch terminal; and the word segmentation region determination sub-module is configured to determine the first display region as the word segmentation region if the external touch falls in the first display region, where the first display region is one of the display regions of the touch terminal.

Preferably, the word segmentation display module includes: a generating sub-module, an adding sub-module and a display sub-module.

The generating sub-module is configured to generate a word segmentation display interface and one or more view controls;

the adding sub-module is configured to add each item in the word segmentation result respectively into one of the view controls; and the display sub-module is configured to display all of the view controls on the word segmentation display interface.

Preferably, the word segmentation processing module includes: a judgment sub-module, a word segmentation sub-module and a determination sub-module;

the judgment sub-module is configured to judge whether the number of characters of the first text is greater than a preset value;

the word segmentation sub-module is configured to acquire the word segmentation result by performing word segmentation on all characters in the first text, if the judgment sub-module judges that the number of characters of the first text is not greater than the preset value;

the determination sub-module is configured to determine a second text based on the position information of the external touch, if the judgment sub-module determines that the number of characters of the first text is greater than the preset value, where the first text includes all characters in the second text, and the number of characters of the second text is equal to the preset value; and the word segmentation sub-module is further configured to acquire the word segmentation result by performing the word segmentation on all characters in the second text, if the judgment sub-module judges that the number of characters of the first text is greater than the preset value.

Preferably, the text processing device further includes: an instruction receiving module, a keyword acquisition module, a keyword display module and a keyword operation module;

the instruction receiving module is configured to receive a keyword selection instruction triggered by a user based on the word segmentation result;

the keyword acquisition module is configured to acquire a keyword selected by the user from the word segmentation result in response to the keyword selection instruction;

the keyword display module is configured to display the keyword;

the instruction receiving module is further configured to receive a keyword operation instruction triggered by the user, where the keyword operation instruction carries an operation type, and the operation type includes searching and sharing; and the keyword operation module is configured to operate the keyword in accordance with the operation type.

Embodiments of the present disclosure also provide another text processing device, including: a display module, a screenshot module, a recognition module and a word segmentation module;

the display module is configured to display a character region on the touch screen;

the screenshot module is configured to acquire a character image by taking a screenshot of the character region, in response to an external touch to the character region;

the recognition module is configured to acquire a to-be-processed text by recognizing characters in the character image;

the word segmentation module is configured to perform word segmentation on characters in the to-be-processed text; and the display module is further configured to display the word segmentation result.

Preferably, the display module includes: a generating sub-module and a display sub-module;

the generating sub-module is configured to generate a word segmentation display interface, where the word segmentation display interface includes one or more subviews; and the display sub-module is configured to display each item in the word segmentation result respectively in one of the subviews.

The present disclosure has at least the following advantages over the conventional art:

With the text processing method provided according to the embodiments of the present disclosure, position information of an external touch is acquired after the external touch is sensed by a touch terminal. A word segmentation region is determined based on the position information of the external touch, and a character image including a to-be-segmented text is acquired from a character region. The character image presents a region in which a keyword to be further operated by the user occurs. After that, characters in the character image are recognized to acquire a first text, and then word segmentation is performed on the first text to acquire the word segmentation result. Then, the word segmentation result is displayed, so that the user can select one or more keywords from the word segmentation result to perform a next operation. In this way, the text processing method according to the embodiment of the present disclosure combines technologies of touch sensing, image recognition and word segmentation, so as to acquire efficiently and quickly a character, a word, a named entity, and the like in the region indicated by the external touch for various systems, which is convenient for a user to select a keyword directly in the text instead of inputting the keyword in the follow-up operation, thus improving the efficiency of operation.

BRIEF DESCRIPTION OF THE DRAWINGS

The drawings used in the description of the embodiments or the conventional technology will be described briefly as follows, in order to describe the technical solutions according to the embodiments of the present application or the conventional technology clearer. It is apparent that the drawings in the following description are only some embodiments of the present application. For those skilled in the art, other drawings may be obtained according to these drawings without any creative work.

FIG. 2b is a schematic diagram of a word segmentation result of the text shown in FIG. 2a;

DETAILED DESCRIPTION OF THE EMBODIMENTS

For a better understanding of the present disclosure by those skilled in the art, the technical solutions according to the embodiments of the present disclosure will be described clearly and completely in conjunction with the drawings. It is clear that the disclosed embodiments are a few of the embodiments of the present disclosure, rather than all of the embodiments. Other embodiments obtained by those skilled in the art based on the embodiments of the disclosure without any creative work fall into the scope of the disclosure.

The foregoing and other objects, features and advantages of the present disclosure will become more apparent from the following detailed description of the embodiments of the present disclosure in conjunction with the accompanying drawings.

Before describing a specific embodiment of the present disclosure, a number of technical terms related to embodiments of the present disclosure are described first.

Pressure touch refers to that, when a touch terminal such as a mobile phone with a touch screen senses an external pressure, the system can acquire pressure information.

Word segmentation refers to dividing a character sequence into a number of individual characters, words or named entities. A word segmentation process is a process of reorganizing a continuous character sequence into individual characters, words or named entities in accordance with some principles.

A named entity refers to a personal name, an organization name, a place name or any other entity identified by name. More broadly, an entity further includes a number, a date, a currency, an address, etc.

A keyword refers to a text fragment in a complete sentence that a user is interested in.

It should be noted that, the text processing method and device according to the embodiments of the present disclosure can be applied no matter what application is run in the touch terminal. The application includes but not limited to a short messager, a web browser, an instant messager and other applications with the function of displaying characters.

First Embodiment of the Text Processing Method

Figure 1:
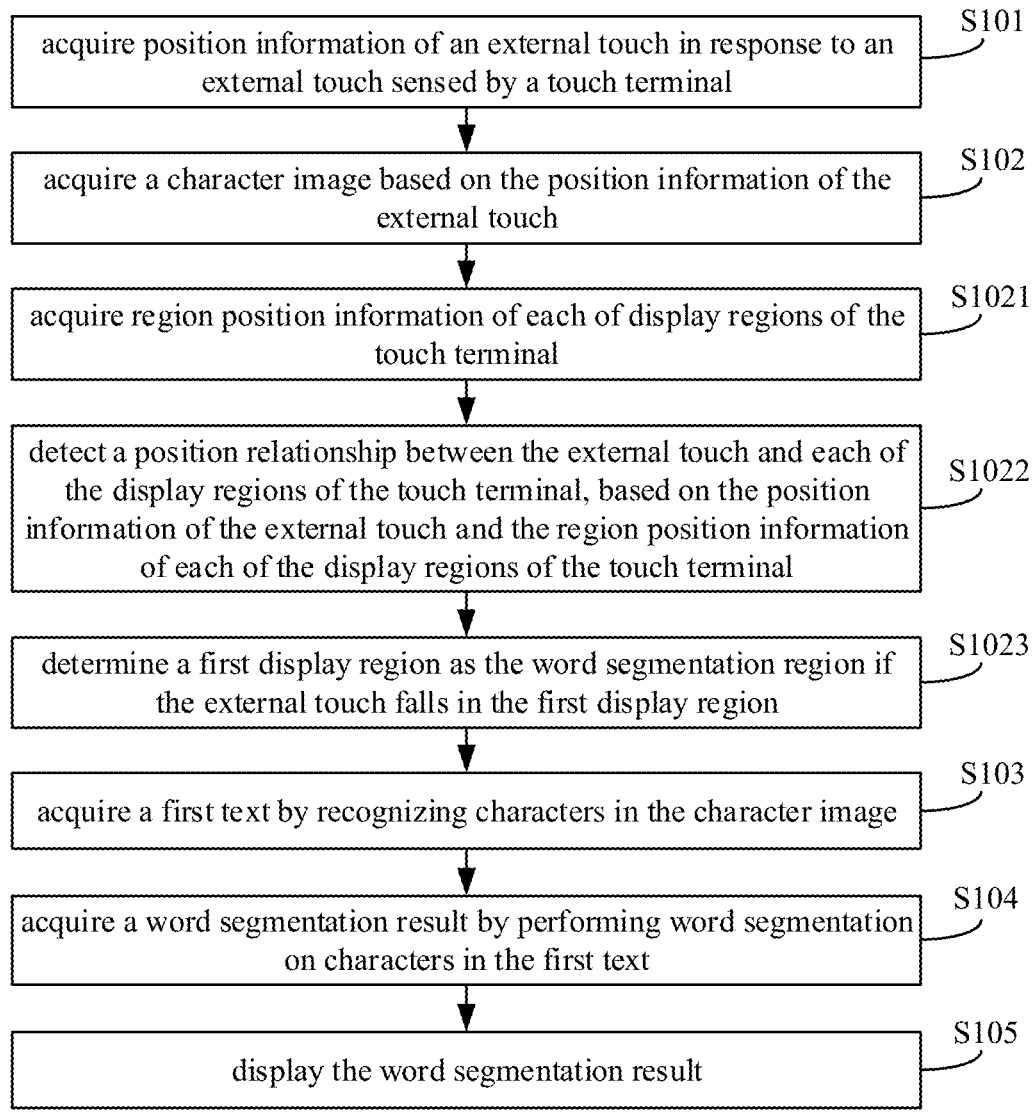
FIG. 1 is a flowchart of a text processing method according to a first embodiment of the present disclosure.

FIG. 1 is a flowchart of the text processing method according to the first embodiment of the present disclosure.

The text processing method according to the present embodiment includes the following steps S101 to S105.

In step S101, position information of an external touch is acquired in response to the external touch sensed by a touch terminal.

Understandably, the touch terminal may be any device having a touch-sensing function, including but not limited to a mobile phone, a tablet computer and a wearable device. The sensed external touch includes but is not limited to a single-point or multipoint press, a single-point or multipoint slide operation, a single-point or multipoint touch, a single-point or multi-point pressure touch, touch region sensing, and the like. The corresponding external touch can be sensed by the touch terminal when the external operation meets a corresponding sensing threshold.

When the touch terminal senses the external touch, the touch terminal acquires position information of the external touch of the touch terminal, such as coordinates of the external touch. The coordinates of the external touch are the coordinates of the external touch on the touch terminal (generally described with an X-axis coordinate and a Y-axis coordinate). At this point, a system can recognize the position of the external touch, to perform various subsequent operations on the touch region.

In step S102, a character image is acquired based on the position information of the external touch.

In some possible implementations of the present embodiment, the step of acquiring a character image based on the position information of the external touch includes: acquiring a word segmentation region based on the position information of the external touch, and acquiring the character image by taking a screenshot of the word segmentation region.

As an example, the external touch may fall in the word segmentation region.

It should be noted that, since incompatibility between different systems may occur, characters displayed on the touch terminal may not be directly acquired. At this point, in order to process the characters displayed on the touch terminal, a character image on which the character is displayed can be acquired by taking a screenshot of the display region of the touch terminal. Then the image recognition technology is adopted to recognize characters in the character image. After that, the recognized text can be processed. In this way, a character displayed on the touch control terminal can be operated even in a case that the character displayed on the touch terminal can not be directly acquired.

The optical character recognition (OCR) technology may be adopted by those skilled in the art to recognize characters in the image.

In practice, there are at least two possible implementations for the step of acquiring a word segmentation region based on the position information of the external touch, which are described in details as follows.

In a first possible implementation, the word segmentation region may be determined based on a current display view of the touch terminal and the position information of the external touch. At this point, the step of acquiring a word segmentation region based on the position information of the external touch includes the following steps S1021 to S1023.

In step S1021, region position information of each of display regions of the touch terminal is acquired.

Understandably, the position of each of the display regions of the touch terminal may change depending on the operation. Therefore, in order to ensure that the image in the region that a user is interested in is accurately acquired, the character image should be determined based on the position of each of the display regions on the terminal at the time when the external touch is sensed.

In step S1022, position relationship between the external touch and each of the display regions of the touch terminal is detected based on the position information of the external touch and the region position information of each of the display regions of the touch terminal.

In step S1023, a first display region is determined as the word segmentation region if the external touch falls in the first display region, where the first display region is one of the display regions of the touch terminal.

In general, display regions for displaying different contents, such as a region for displaying a character and a region for displaying an image, are located at different positions of the touch terminal. Each of the display regions is identified with region coordinates. And in general, the position coordinates of each of the display regions of the touch terminal are stored in the system. After acquiring the position information of the external touch, which display region the external touch falls in can be recognized based on the position coordinates of each of the display regions of the touch terminal and the position information of the external touch. Then the display region can be determined as a word segmentation region.

Taking the coordinates as an example, the region position information of each of the display regions of the touch terminal is a coordinate range of the region. After acquiring the coordinates of the external touch, the external touch falls in the coordinate range of which display region of the touch terminal may be determined. The region in which the external touch is located is the word segmentation region.

In some possible cases, the external touch may fall in a display region for displaying an image. After acquiring the position information of the external touch, the display region is determined as the word segmentation region, and the image displayed in the region is a character image, in which case there is no need to take a screenshot of the word segmentation region.

In addition, when a full screen display application, such as a web browser or a reader, is run on the touch terminal, the display regions of the touch terminal are not divided by a visible line. At this point, the screen display region is also divided into a picture display region and a character display region, which are displayed by different view controls, and identified with the position information. If the external touch is in the display region where a text is displayed, the display region of the entire text on the touch terminal is determined as the word segmentation region.

Figure 2B:
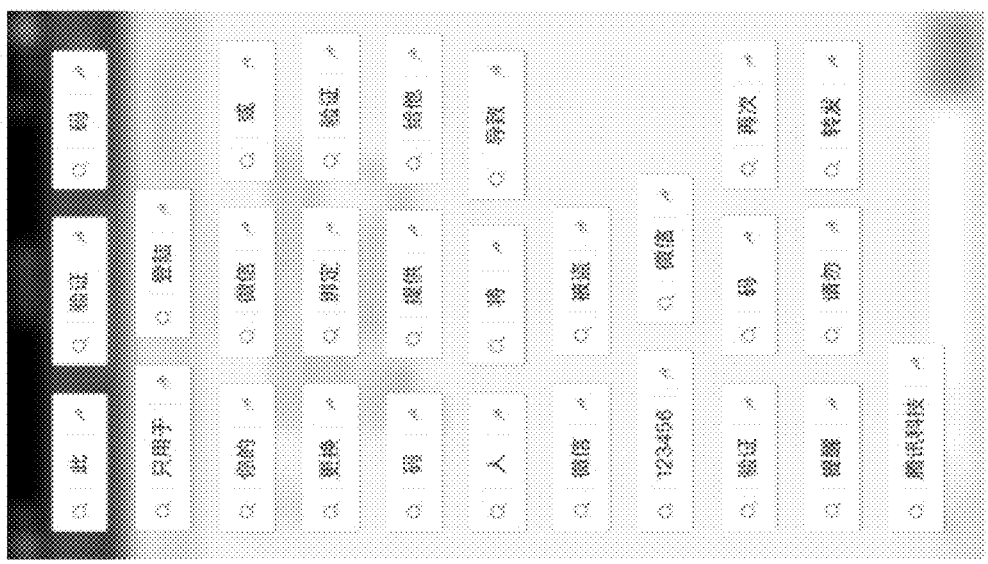
Figure 2A:
FIG. 2a is a schematic diagram of a external touch region and a word segmentation region in a text processing method according to an embodiment of the present disclosure.

FIG. 2a illustrates an example of the method of acquiring the word segmentation region in this possible implementation. Understandably, the followings are exemplary illustration only, which are not for any limitation.

As shown in FIG. 2a, the external touch falls in the region surrounded by the circle on the touch terminal which a finger points to. At this point, the system can acquire the position information of the external touch, and determine a region of a short message text box as the word segmentation region based on the position information of the external touch and the position of each of the view controls.

It should also be noted that, FIG. 2a shows the external touch activated by single-finger pressing only as an example to describe how to determine a word segmentation region, while the means for activating an external touch is not limited in the present disclosure, which may be configured by those skilled in the art according to circumstances with similar embodiments to those described above and will not be described in detail herein.

In a second possible implementation, the word segmentation region may be determined based on a predetermined word segmentation range.

Specifically, after acquiring the position information of the external touch, a region including the external touch is determined as the word segmentation region based on the preset word segmentation range. For example, the word segmentation region may be defined as a region having an upper edge 100 pixels above the external touch and a lower edge 100 pixels below the external touch and having a width as the display width of the touch terminal.

It should be noted that, when using the method of dividing regions, incomplete characters may be included in the region. At this point, when performing character recognition on the character image, the incomplete characters may affect the accuracy of the character recognition. Therefore, after acquiring the word segmentation region, the word segmentation region may be reduced or enlarged accordingly so as to avoid incomplete characters. Alternatively, after acquiring the character image by taking a screenshot, the image recognition technique may be adopted to recognize incomplete characters in the text image, to remove the incomplete characters from the character image.

In step S103, a first text is acquired by recognizing characters in the character image.

The optical character recognition (OCR) technology may be adopted by those skilled in the art to recognize characters in the character image. Detailed description for the character recognition methods and procedures are omitted herein.

In step S104, a word segmentation result is acquired by performing word segmentation on characters in the first text.

As an example, those skilled in the art may adopt a natural language algorithm to segment the first text according to the specific semantics of the characters in the first text. Detailed description for the word segmentation methods and procedures are omitted herein.

Since the number of characters included in the word segmentation region may be too large, in practice, if the word segmentation operation is performed on all the characters in the first text, too many items of the word segmentation result may be acquired, which is not convenient for a user to select keywords. Therefore, in order to improve the efficiency of word segmentation and facilitate selecting by the user the keyword from the word segmentation result, in the text processing method according to the embodiment, a part of the characters in the character image may be selected to be segmented according to circumstances, so that the user can choose a keyword from the word segmentation result of the part of the characters, thereby improving the interactive experience of the user.

In a preferred implementation of the present embodiment, the step of acquiring a word segmentation result by performing word segmentation on characters in the first text, includes: determining whether the number of characters of the first text is greater than a preset value; acquiring the word segmentation result by performing the word segmentation on all characters in the first text if the number of characters of the first text is not greater than the preset value; and determining a second text based on the position information of the external touch and acquiring the word segmentation result by performing the word segmentation on all characters in the second text if the number of characters of the first text is greater than the preset value, where the first text includes all characters in the second text, and the number of characters of the second text is equal to the preset value.

It should be noted that, when the position information of the external touch is acquired, characters in the first text near to the external touch may be determined. At this point, characters near to the external touch and having a number equal to the preset value are acquired to generate the second text according to the preset rule, and then a word segmentation result is acquired by performing word segmentation on the second text. For example, 50 or 100 characters near to the sensed pressure region are acquired to generate the second text. A half of the 50 or 100 characters may be taken in front of the external touch, and the other half of the 50 or 100 characters may be taken behind the external touch. The method for acquiring the second text may be configured by those skilled in the art according to circumstances, which are not listed herein.

In step S105, the word segmentation result is displayed.

After performing word segmentation on the first text, a word segmentation result of multiple words, characters, phases and named entities is acquired. FIG. 2b shows the word segmentation result obtained from the text in the word segmentation region shown in FIG. 2a.

After performing word segmentation on the text displayed in the character image, the word segmentation result is displayed. In this way, a keyword that needs further operation may be selected directly from the word segmentation result by the user, which is convenient for the user to directly operate the keyword in the text.

Understandably, the word segmentation result acquired in the above embodiments may be displayed to the user in a window. Furthermore, the user may choose to close the keyword selection window to terminate the keyword selection process.

In some possible implementations of the present embodiment, the step of displaying the word segmentation result includes: generating a word segmentation display interface and one or more view controls, adding each item in the word segmentation result respectively into one of the view controls, and displaying all of the view controls on the word segmentation display interface.

Figure 3C:
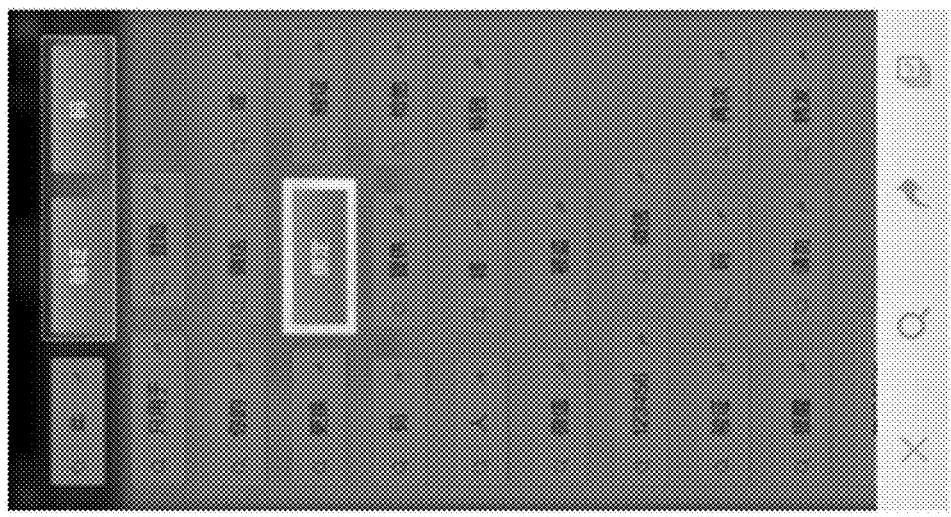
FIGS. 3a to 3c are schematic diagrams of a word segmentation display interface in a text processing method according to an embodiment of the present disclosure.
Figure 3B:
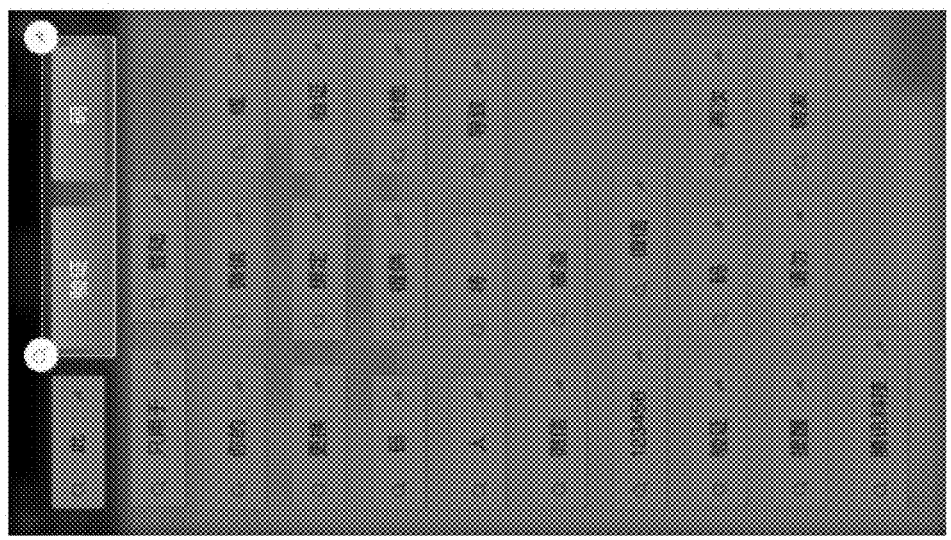
Figure 3A:
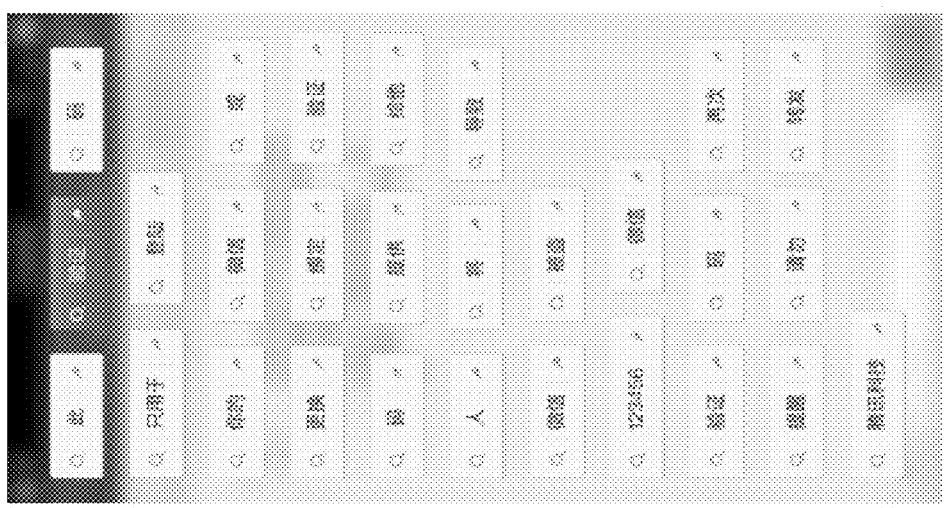
Figure 4A:
FIG. 4a and FIG. 4b are schematic diagrams of performing an operation on a keyword in a word segmentation result in a text processing method according to an embodiment of the present disclosure.
Figure 4B:

FIGS. 3a to 3c show a specific implementation of a word segmentation display interface. In the word segmentation display interface, each rectangle block represents a displayed view control, and each of the view controls is configured to display an item (a character, a word or a named entity) in the word segmentation result. A display size, a display location or the like of each of the view controls may be configured according to circumstances. For example, the view controls may be dispersed in the word segmentation display interface to facilitate selecting a keyword by the user. Also, characters, words or named entities in the word segmentation result may be displayed using different colors, fonts, sizes, or the like as required. For example, a different display effect may be employed to show a number or a word with a high probability to be selected by the user from the word segmentation result. A user may directly click the corresponding view control in the word segmentation display interface when selecting keyword from the word segmentation result. The characters, words or named entities in the word segmentation result may be separated by a space or a line without a space as shown in FIGS. 4a to 4c. In the case that there are too many items in the word segmentation result which can not be fully displayed in one screen in a distinguishable way, the word segmentation result may be displayed to the user in a single screen supporting a slide operation, or in multiple screens. In addition, the word segmentation display interface or window includes a close button as the button "×" shown in the lower left corner of FIG. 3c. The user may close the word segmentation display interface or window by clicking the close button.

In addition, the word segmentation display interface may be in the display mode as shown in FIGS. 3a to 3c, or in other display modes, such as a display window created near the external touch region. The mode of displaying the word segmentation result and the sequence of each item in the word segmentation result can be configured by those skilled in the art according to circumstances. For example, a number or a word with a high use probability is displayed in front or highlighted.

In some possible implementations of the present embodiment, after displaying the word segmentation result, the method further includes the following steps.

First, a keyword selection instruction triggered by a user based on the word segmentation result is received.

It should be noted that, as shown in FIGS. 3a to 3c, the user may select one or more characters, words or named entities, and may also select continuous or discontinuous characters, words or named entities, from the word segmentation result.

Second, the keyword selected by the user is acquired from the word segmentation result in response to the keyword selection instruction; then the keyword is displayed.

As shown in FIG. 4a and FIG. 4b, a user triggers the keyword selection instruction by clicking on a word or named entity in the word segmentation result. After receiving the keyword selection instruction, the keywords selected by the user is displayed in a noticeable way (such as highlighting, changing the color or the font of the view control), so that the user can perform subsequent operations on the keyword.

Next, a keyword operation instruction triggered by the user is received, where the keyword operation instruction carries an operation type, and the operation type includes searching and sharing.

Finally, the keyword is operated in accordance with the operation type.

Figure 5A:
FIGS. 5a to 5c are schematic diagrams of performing another operation on a keyword in a word segmentation result in a text processing method according to an embodiment of the present disclosure.
Figure 5B:
Figure 5C:

After the user selects one or more view controls, operation buttons corresponding to the various operation types are generated in the corresponding positions. Then the user clicks the operation button near the keyword to trigger the corresponding keyword operation instruction for the keyword. Different operation buttons represent different operation types. After that, the keyword selected by the user is operated in accordance with the operation type. The operation includes but is not limited to searching and sharing. FIG. 4a and FIG. 4b illustrate an example of performing a search operation on a keyword, and FIGS. 5a to 5c illustrate an example of performing a sharing operation on a keyword, including performing operations on a single character, word or named entity and on multiple characters, words or named entities in the word segmentation result.

With the text processing method according to the present embodiment, position information of an external touch is acquired after the external touch is sensed by a touch terminal. A word segmentation region is determined based on the position information of the external touch, and a character image including a to-be-segment text is acquired from a character region. The character image presents a region in which a keyword to be further operated by the user occurs. After that, characters in the character image are recognized to acquire a first text, and then word segmentation is performed on the first text to acquire the word segmentation result. Then, the word segmentation result is displayed, so that the user can select one or more keywords from the word segmentation result to perform a next operation. In this way, the text processing method according to the present embodiment combines technologies of touch sensing, image recognition and word segmentation, so as to acquire efficiently and quickly a character, a word, a named entity, and the like in the region indicated by the external touch for various systems, which is convenient for a user to select a keyword directly in the text instead of inputting the keyword in the follow-up operation, thus improving the efficiency of operation.

Second Embodiment of the Text Processing Method

Figure 6:
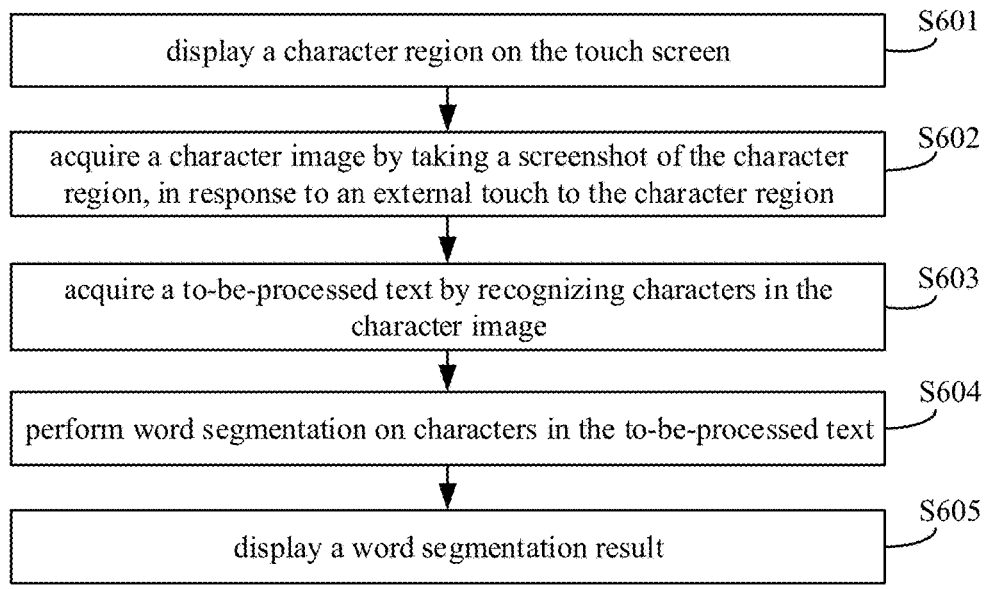
FIG. 6 is a flowchart of a text processing method according to a second embodiment of the present disclosure.

FIG. 6 is a flowchart of the text processing method according to the second embodiment of the present disclosure.

It should be noted that the text processing method provided in the present embodiment can be applied to any client device having a touch-sensitive function, including but not limited to a mobile phone, a tablet computer or the like.

The text processing method according to the present embodiment includes the following steps S601 to S605.

in step S601, a character region is displayed on the touch screen.

Understandably, the touch screen is a display device on the client device, for example, a display screen of a mobile phone is a touch screen. The client device may display different types of content in different regions of the touch screen, which may include one or more regions for displaying characters and one or more regions for displaying images.

The character region described above is a region containing characters, which may be a region for displaying a text on the touch screen, or a region for displaying an image on the touch screen, where the images contain characters.

It should be noted that, since incompatibility between different systems may occur, characters may be displayed in the form of image on the system of the touch screen, so that actual characters can not be directly acquired by the system.

At this point, in order to process the characters displayed on the touch terminal, a character image on which the character is displayed can be acquired by taking a screenshot of the display region of the touch terminal. And then the image recognition technology is adopted to recognize characters in the character image. After that, the recognized text can be processed. In this way, operating a character displayed on the touch screen can be ensured under different system conditions.

Step S602 includes: a character image is acquired by taking a screenshot of the character region, in response to an external touch to the character region.

It should be noted that, since incompatibility between different systems may occur, characters displayed on the touch terminal can not be directly acquired. At this point, in order to process the characters displayed on the touch terminal, a character image on which the character is displayed can be acquired by taking a screenshot of the display region of the touch terminal. Then the image recognition technology is adopted to recognize characters in the character image. After that, the recognized text can be processed. In this way, a character displayed on the touch control terminal can be operated even in the case that the character displayed on the touch terminal can not be directly acquired.

In some possible cases, the character region may be a region for displaying an image. In response to an external touch on the character region, an image (i.e. a character image) displayed in the region can be directly acquired without the process of taking a screenshot of the word segmentation region.

In step S603, a to-be-processed text is acquired by recognizing characters in the character image.

By sensing the external touch to the corresponding character image by a user, parts of contents in the display region on the touch screen which need to be operated can be determined. The external touches include but are not limited to a single-point or multipoint press, a single-point or multipoint slide operation, a single-point or multipoint touch, a single-point or multi-point pressure touch, touch region sensing, and the like. The corresponding external touch can be sensed by the client device when the external operation meets the corresponding sensing threshold. After performing word segmentation on the characters in a text region, a word segmentation result of multiple words, characters, phases and named entities are acquired. A character recognition technology may be adopted to acquire characters in the text region.

The optical character recognition (OCR) technology may be adopted by those skilled in the art to recognize characters in the character image.

In step S604, word segmentation is performed on characters in the to-be-processed text.

As an example, those skilled in the art may adopt a natural language algorithm to segment the first text according to the specific semantics of the characters in the first text. Detailed description for the word segmentation methods and procedures are omitted herein.

In step S605, the word segmentation result is displayed.

After performing word segmentation on the text of the character image, the word segmentation result is displayed. In this way the user can directly select the keywords that need further operation from the word segmentation result so that the user can directly operate the keywords in the text.

FIG. 2b shows the word segmentation result of the text in the character image shown in FIG. 2a.

After performing word segmentation on the text displayed in the character image, the word segmentation result is displayed. In this way, keywords that need further operation may be selected directly from the word segmentation result by the user, which can enable the user directly operate the keywords in the text.

Understandably, the word segmentation result acquired in the above embodiments may be displayed to the user in a window. In addition, the user may choose to close the keyword selection window to terminate the keyword selection process.

In some possible implementations of the present embodiment, the step of displaying the word segmentation result specifically includes: generating a word segmentation display interface, where the word segmentation display interface includes one or more subviews; and displaying each item in the word segmentation result respectively in one of the subviews.

FIGS. 3a to 3c show a specific implementation of a word segmentation display interface. In the word segmentation display interface, each rectangle block represents a displayed view control, and each of the view controls is configured to display an item (a character, a word or a named entity) in the word segmentation result. A display size, a display location or the like of each of the view controls may be configured according to circumstances. For example, the view controls may be dispersed in the word segmentation display interface to facilitate selecting a keyword by the user. Also, characters, words or named entities in the word segmentation result may be displayed using different colors, fonts, sizes, or the like as required. For example, a different display effect may be employed to show a number or a word with a high probability to be selected by the user from the word segmentation result. A user may directly click the corresponding view control in the word segmentation display interface when selecting keyword from the word segmentation result. The characters, words or named entities in the word segmentation result may be separated by a space or a line without a space. In the case that there are too many items in the word segmentation result which can not be fully displayed in one screen in a distinguishable way, the word segmentation result may be displayed to the user with a single screen supporting a slide operation, or in multiple screens. In addition, the word segmentation display interface or the window includes a close button as the button "×" shown in the lower left corner of FIG. 3c. The user may close the word segmentation display interface or window by clicking the close button.

In addition, the word segmentation display interface may be in the display mode as shown in FIGS. 3a to 3c, or in other display modes, such as a window display created near the external touch region. The mode of displaying the word segmentation result and the sequence of each items of the word segmentation result can be configured by those skilled in the art according to circumstances. For example, a number or a word with a high use probability is displayed in front or highlighted.

In some possible implementations of the present embodiment, after displaying the word segmentation result, the method further includes the following steps.

First, a keyword selection instruction triggered by a user based on the word segmentation result is received.

It should be noted that, as shown in FIGS. 3a to 3c, the user may select one or more characters, words or named entities, and may also select continuous or discontinuous characters, words or named entities, from the word segmentation result.

Second, the keyword selected by the user is acquired from the word segmentation result in response to the keyword selection instruction, and then the keyword is displayed.

As shown in FIG. 4a and FIG. 4b, a user triggers the keyword selection instruction by clicking on a word or named entity in the word segmentation result. After receiving the keyword selection instruction, the keywords selected by the user is displayed in a noticeable way (such as highlighting, changing the color or the font of the view control), so that the user can perform subsequent operations on the keyword.

Next, a keyword operation instruction triggered by the user is received, where the keyword operation instruction carries an operation type, and the operation type includes searching and sharing.

Finally, the keyword is operated in accordance with the operation type.

After the user selects one or more view controls, operation buttons corresponding to the various operation types are generated in the corresponding positions. Then the user clicks the operation button near the keyword to trigger the corresponding keyword operation instruction for the keyword. Different operation buttons represent different operation types. After that, the keyword selected by the user is operated in accordance with the operation type. The operation includes but is not limited to searching and sharing. FIG. 4a and FIG. 4b illustrate an example of performing a search operation on a keyword, and FIGS. 5a to 5c illustrate an example of performing a sharing operation on a keyword, including performing operations on a single character, word or named entity and on multiple characters, words or named entities in the word segmentation result.

In the text processing device according to the present embodiment, after a character image is displayed on the touch screen, characters in a character image is recognized after an external touch is sensed on the character image, and word segmentation is performed on the recognized characters. Thereafter, the word segmentation result is displayed, so that the user can select one or more keywords from the word segmentation result to perform a next operation. The text processing method according to the embodiment combines technologies of touch sensing, image recognition and word segmentation, so as to acquire efficiently and quickly a character, a word, a named entity, and the like in the region indicated by the external touch for various systems, which is convenient for a user to select a keyword directly in the text instead of inputting the keyword in the follow-up operation, thus improving the efficiency of operation.

According to the text processing method provided in the above embodiment the embodiment of the present disclosure also provides a text processing device.

First Embodiment of the Text Processing Device

Figure 7:
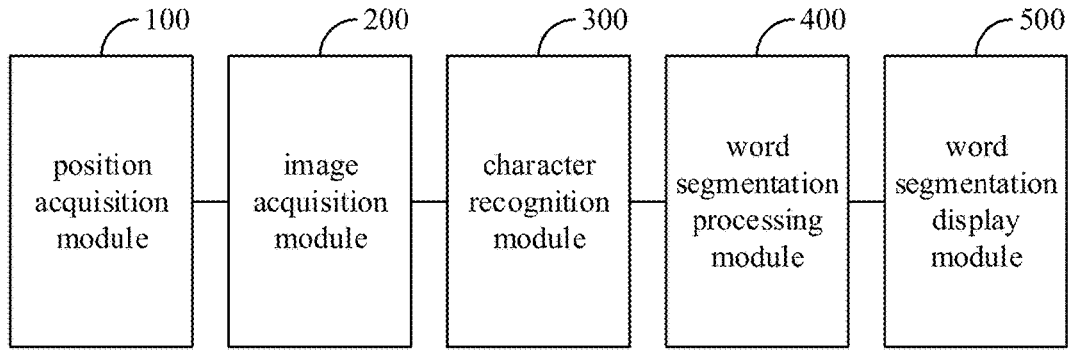
FIG. 7 is a schematic structural diagram of the text processing device according to a first embodiment of the present disclosure.

FIG. 7 is a schematic structural diagram of the text processing device according to the first embodiment of the present disclosure.

The text processing device according to the present embodiment includes: a position acquisition module 100, an image acquisition module 200, a character recognition module 300, a word segmentation processing module 400 and a word segmentation display module 500.

The position acquisition module 100 is configured to acquire position information of an external touch in response to an external touch sensed by a touch terminal.

The image acquisition module 200 is configured to acquire a character image based on the position information of the external touch.

As an example, the image acquisition module 200 specifically includes: an acquisition sub-module and a screenshot sub-module (not shown in the Figures).

The acquisition sub-module is configured to acquire a word segmentation region based on the position information of the external touch.

As an example, the acquisition sub-module specifically includes: a position information acquisition sub-module, a position relationship determination sub-module and a word segmentation region determination sub-module (not shown in the Figures).

The position information acquisition sub-module is configured to acquire region position information of each of display regions of the touch terminal.

The positional relationship determination sub-module is configured to detect a position relationship between the external touch and each of the display regions of the touch terminal, based on the position information of the external touch and the region position information of each of the display regions of the touch terminal.

The word segmentation region determination sub-module is configured to determine the first display region as the word segmentation region if the external touch falls in the first display region, where the first display region is one of the display regions of the touch terminal.

The screenshot sub-module is configured to acquire the character image by taking a screenshot of the word segmentation region.

The character recognition module 300 is configured to acquire a first text by recognizing characters in the character image.

The word segmentation processing module 400 is configured to acquire a word segmentation result by performing word segmentation on the first text.

In an example, the word segmentation module 400 specifically includes: a judgment sub-module, a word segmentation sub-module and a determination sub-module (not shown in the Figures).

The judgment sub-module is configured to judge whether the number of characters of the first text is greater than a preset value.

The word segmentation sub-module is configured to acquire the word segmentation result by performing word segmentation on characters in the first text, if the judgment sub-module judges that the number of characters of the first text is not greater than the preset value.

The determination sub-module is configured to determine a second text based on the position information of the external touch if the judgment sub-module determines that the number of characters of the first text is greater than the preset value, where the first text includes all characters in the second text, and the number of characters of the second text is equal to the preset value.

The word segmentation sub-module is further configured to acquire the word segmentation result by performing the word segmentation on all characters in the second text, if the judgment sub-module judges that the number of characters of the first text is greater than the preset value.

The word segmentation display module 500 is configured to display the word segmentation result.

In an example, the word segmentation display module 500 specifically includes: a generating sub-module, an adding sub-module and a display sub-module (neither shown in the Figures).

The generating sub-module is configured to generate a word segmentation display interface and one or more view controls.

The adding sub-module is configured to add each item in the word segmentation result respectively into one of the view controls.

The display sub-module is configured to display all of the view controls on the word segmentation display interface.

In some possible implementations, the text processing device according to the present embodiment includes: an instruction receiving module, a keyword acquisition module, a keyword display module and a keyword operation module (not shown in the Figures).

The instruction receiving module is configured to receive a keyword selection instruction triggered by a user based on the word segmentation result.

The keyword acquisition module is configured to acquire a keyword selected by the user from the word segmentation result in response to the keyword selection instruction.

The keyword display module is configured to display the keyword.

The instruction receiving module is further configured to receive a keyword operation instruction triggered by the user, where the keyword operation instruction carries an operation type, and the operation type includes searching and sharing.

The keyword operation module is configured to operate the keyword in accordance with the operation type.

With the text processing device according to the present embodiment, position information of an external touch is acquired by the position acquisition module after the external touch is sensed by a touch terminal. A word segmentation region is determined by the image acquisition module based on the position information of the external touch, and a character image including a to-be-segment text is from a character region. The character image presents a region in which a keyword to be further operated by the user occurs. After that, characters in the character image are recognized by the character recognition module to acquire a first text, and then word segmentation is performed on the first text by the word segmentation processing module to acquire the word segmentation result. Then, the word segmentation result is displayed by the word segmentation display module, so that the user can select one or more keywords from the word segmentation result to perform a next operation. In this way, the text processing device according to the present embodiment combines technologies of touch sensing, image recognition and word segmentation, so as to acquire efficiently and quickly a character, a word, a named entity, and the like in the region indicated by the external touch for various systems, which is convenient for a user to select a keyword directly in the text instead of inputting the keyword in the follow-up operation, thus improving the efficiency of operation.

Second Embodiment of the Text Processing Device

Figure 8:
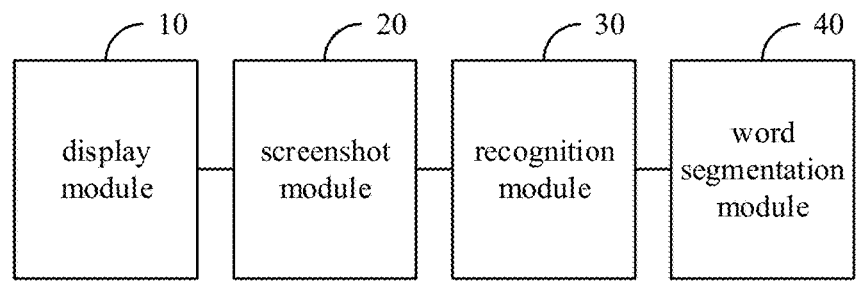
FIG. 8 is a schematic structural diagram of the text processing device according to a second embodiment of the present disclosure.

FIG. 8 is a schematic structural diagram of the text processing device according to the second embodiment of the present disclosure.

The text processing device according to the present embodiment includes: a display module 10, a screenshot module 20, a recognition module 30 and a word segmentation module 40.

The display module 10 is configured to display the character region on the touch screen.

The screenshot module 20 is configured to acquire a character image by taking a screenshot of the character region, in response to an external touch to the character region.

The recognition module 30 is configured to acquire a to-be-processed text by recognizing characters in the character image.

The word segmentation module 40 is configured to perform word segmentation on characters in the to-be-processed text.

The display module 10 is further configured to display the word segmentation result.

In an example, the display module 10 specifically includes: a generating sub-module and a display sub-module (not shown in the Figures).

The generating sub-module is configured to generate a word segmentation display interface, where the word segmentation display interface includes one or more subviews.

The display sub-module is configured to display each item in the word segmentation result respectively in one of the subviews.

In the text processing device according to the present embodiment, after the display module displayed a character image on the touch screen, the recognition module recognizes characters in the character image after an external touch is sensed on the character image, and the word segmentation module performs word segmentation on the recognized characters. Then, the word segmentation result is displayed by display module, so that a user can select one or more keywords from the word segmentation result to perform a next operation. The text processing device according to the present embodiment combines technologies of touch sensing, image recognition and word segmentation, so as to acquire efficiently and quickly a character, a word, a named entity, and the like in the region indicated by the external touch for various systems, which is convenient for a user to select a keyword directly in the text instead of inputting the keyword in the follow-up operation, thus improving the efficiency of operation.

It should be noted that the various embodiments of the present specification are described in a progressive way, differences from other embodiments are emphatically illustrated in each of the embodiments, and reference can be made to each other for description of same or similar parts between embodiments. For the device disclosed in the embodiment, since it corresponds to the method disclosed in the embodiment, the description is relatively simple and reference can be made to the description of the method for the related part.

It should further be note that, relational terms such as first and second and the like are used solely to distinguish one entity or operation from another entity or operation without necessarily requiring or implying any actual such relationship or order between such entities or operations. The terms "comprise", "include" or any other variation thereof, are intended to cover a non-exclusive inclusion, such that a process, method, article, or device that includes a list of elements include not only those elements but may also include other elements not expressly listed or inherent to such process, method, article, or device. An element defined by a sentence "comprises a . . . " without any more definitions does not preclude the existence of additional identical elements in the process, method, article or device that includes the element.

The steps of a method or algorithm described in the embodiments disclosed herein may be embodied directly in hardware, in a software module executed by a processor, or in a combination thereof. A software module may reside in a Random Access Memory (RAM), a flash memory, a Read Only Memory (ROM), an Electrically Programmable ROM (EPROM), an Electrically Erasable Programmable ROM (EEPROM), a register, a hard disk, a removable disk, a CD-ROM, or any other form of storage medium known in the art.

The above only describes preferred embodiments of the present disclosure and is not intended to be limitation to the present disclosure in any manners. Although the preferred embodiments are disclosed above, the disclosure is not limited thereto. Those skilled in the art may make various changes, modifications or equivalents to the technical solution of the present disclosure based on the disclosed method and technical content without departing the scope of the disclosed technical solution. Such changes, equivalents or modifications are included within the protection scope of the technical solution of the present disclosure.

The invention claimed is:

1. A text processing method, comprising:
acquiring position information of an external touch in response to an external touch sensed by a touch terminal, wherein the touch terminal comprises a plurality of distinctive display regions for displaying different contents at different positions of the touch terminal, and wherein at least one of the plurality of distinctive display regions contains characters to be recognized;
acquiring region position information of each of the distinctive display regions of the touch terminal;
detecting a position relationship between the external touch and each of the distinctive display regions of the touch terminal, based on the position information of the external touch and the region position information of each of the distinctive display regions of the touch terminal; and
acquiring a character image of at least one distinctive display region if the external touch falls in the at least one distinctive display region, the character image being an image of a single or a subset of the plurality of the distinctive display regions;
acquiring a first text by recognizing characters in the character image;
acquiring a word segmentation result by performing word segmentation on characters in the first text; and
displaying the word segmentation result.

2. The text processing method according to claim 1, wherein
acquiring the character image comprises taking a screenshot of the at least one distinctive display region.

3. The text processing method according to claim 2, wherein after displaying the word segmentation result, the text processing method further comprises:
receiving a keyword selection instruction triggered by a user based on the word segmentation result;
acquiring a keyword selected by the user from the word segmentation result in response to the keyword selection instruction;
displaying the keyword;

receiving a keyword operation instruction triggered by the user, wherein the keyword operation instruction carries an operation type, and the operation type comprises searching and sharing; and operating the keyword in accordance with the operation type.

4. The text processing method according to claim 1, wherein the step of displaying the word segmentation result comprises:

generating a word segmentation display interface and one or more view controls;

adding each item in the word segmentation result respectively into one of the view controls; and displaying all of the view controls on the word segmentation display interface.

5. The text processing method according to claim 4, wherein after displaying the word segmentation result, the text processing method further comprises:

receiving a keyword selection instruction triggered by a user based on the word segmentation result;

acquiring a keyword selected by the user from the word segmentation result in response to the keyword selection instruction;

displaying the keyword;

receiving a keyword operation instruction triggered by the user, wherein the keyword operation instruction carries an operation type, and the operation type comprises searching and sharing; and operating the keyword in accordance with the operation type.

6. The text processing method according to claim 1, wherein the step of acquiring a word segmentation result by performing word segmentation on characters in the first text comprises:

determining whether the number of characters of the first text is greater than a preset value;

acquiring the word segmentation result by performing the word segmentation on all characters in the first text if the number of characters of the first text is not greater than the preset value; and determining a second text based on the position information of the external touch and acquiring the word segmentation result by performing the word segmentation on all characters in the second text, if the number of characters of the first text is greater than the preset value, wherein the first text comprises all characters in the second text, and the number of characters of the second text is equal to the preset value.

7. The text processing method according to claim 6, wherein after displaying the word segmentation result, the text processing method further comprises:

receiving a keyword selection instruction triggered by a user based on the word segmentation result;

acquiring a keyword selected by the user from the word segmentation result in response to the keyword selection instruction;

displaying the keyword;

receiving a keyword operation instruction triggered by the user, wherein the keyword operation instruction carries an operation type, and the operation type comprises searching and sharing; and operating the keyword in accordance with the operation type.

8. The text processing method according to claim 1, wherein after displaying the word segmentation result, the text processing method further comprises:

receiving a keyword selection instruction triggered by a user based on the word segmentation result;

acquiring a keyword selected by the user from the word segmentation result in response to the keyword selection instruction;

displaying the keyword;

receiving a keyword operation instruction triggered by the user, wherein the keyword operation instruction carries an operation type, and the operation type comprises searching and sharing; and operating the keyword in accordance with the operation type.

9. The text processing method according to claim 1, wherein after displaying the word segmentation result, the text processing method further comprises:

receiving a keyword selection instruction triggered by a user based on the word segmentation result;

acquiring a keyword selected by the user from the word segmentation result in response to the keyword selection instruction;

displaying the keyword;

receiving a keyword operation instruction triggered by the user, wherein the keyword operation instruction carries an operation type, and the operation type comprises searching and sharing; and operating the keyword in accordance with the operation type.

10. A text processing device, comprising: a processor configured to execute a position acquisition module, an image acquisition module, a character recognition module, a word segmentation processing module and a word segmentation display module, and a memory configured to store the position acquisition module, the image acquisition module, the character recognition module, the word segmentation processing module and the word segmentation display module, wherein the position acquisition module is configured to acquire position information of an external touch in response to an external touch sensed by a touch terminal, wherein the touch terminal comprises a plurality of distinctive display regions for displaying different contents at different positions of the touch terminal, and wherein at least one of the plurality of distinctive display regions contains characters to be recognized;

the image acquisition module is configured to acquire a character image of at least one distinctive display region if the external touch falls in the at least one distinctive display region, the character image being an image of a single or a subset of the plurality of distinctive display regions, wherein the image acquisition module comprises:

a position information acquisition sub-module configured to acquire region position information of each of the distinctive display regions of the touch terminal; and a position relationship determination sub-module configured to detect a position relationship between the external touch and each of the distinctive display regions of the touch terminal, based on the position information of the external touch and the region position information of each of the distinctive display regions of the touch terminal;

the character recognition module is configured to acquire a first text by recognizing characters in the character image;

the word segmentation processing module is configured to acquire a word segmentation result by performing word segmentation on the first text; and the word segmentation display module is configured to display the word segmentation result.

11. The text processing device according to claim 10, wherein the image acquisition module comprises a screenshot sub-module configured to acquire the character image by taking a screenshot of the particular distinctive display region.

12. The text processing device according to claim 10, wherein the word segmentation display module comprises: a generating sub-module, an adding sub-module and a display sub-module;

the generating sub-module is configured to generate a word segmentation display interface and one or more view controls;

the adding sub-module is configured to add each item in the word segmentation result respectively into one of the view controls; and the display sub-module is configured to display all of the view controls on the word segmentation display interface.

13. The text processing device according to claim 10, wherein the word segmentation processing module comprises: a judgment sub-module, a word segmentation sub-module and a determination sub-module;

the judgment sub-module is configured to judge whether the number of characters of the first text is greater than a preset value;

the word segmentation sub-module is configured to acquire the word segmentation result by performing the word segmentation on all characters in the first text, if the judgment sub-module judges that the number of characters of the first text is not greater than the preset value;

the determination sub-module is configured to determine a second text based on the position information of the external touch if the judgment sub-module determines that the number of characters of the first text is greater than the preset value, wherein the first text comprises all characters in the second text, and the number of characters of the second text is equal to the preset value; and the word segmentation sub-module is further configured to acquire the word segmentation result by performing the word segmentation on all characters in the second text, if the judgment sub-module judges that the number of characters of the first text is greater than the preset value.

14. The text processing device according to claim 10, further comprising: an instruction receiving module, a keyword acquisition module, a keyword display module and a keyword operation module, wherein the instruction receiving module is configured to receive a keyword selection instruction triggered by a user based on the word segmentation result;

the keyword acquisition module is configured to acquire a keyword selected by the user from the word segmentation result in response to the keyword selection instruction;

the keyword display module is configured to display the keyword;

the instruction receiving module is further configured to receive a keyword operation instruction triggered by the user, wherein the keyword operation instruction carries an operation type, and the operation type comprises searching and sharing; and the keyword operation module is configured to operate the keyword in accordance with the operation type.

15. A text processing device, comprising: a processor configured to execute a display module, a screenshot module, a recognition module and a word segmentation module, and a memory configured to store the display module, the screenshot module, the recognition module and the word segmentation module, wherein the display module is configured to display a character region on the touch screen, wherein the touch terminal comprises a plurality of distinctive display regions for displaying different contents at different positions of the touch terminal, and wherein the character region is one of the plurality of distinctive display regions containing characters to be recognized;

the screenshot module is configured to acquire a character image by taking a screenshot of the character region if an external touch falls in the character region, the character image being a screenshot of a single or a subset of the plurality of distinctive display regions;

the recognition module is configured to acquire a to-be-processed text by recognizing characters in the character image;

the word segmentation module is configured to perform word segmentation on characters in the to-be-processed text; and the display module is further configured to display the word segmentation result.

16. The text processing device according to claim 15, wherein the display module comprises: a generating sub-module and a display sub-module;

the generating sub-module is configured to generate a word segmentation display interface, wherein the word segmentation display interface comprises one or more subviews; and the display sub-module is configured to display each item in the word segmentation result respectively in one of the subviews.

* * * * *